United States Patent [19]

Nohr et al.

[11] Patent Number: 4,976,788
[45] Date of Patent: Dec. 11, 1990

[54] METHOD OF CLEANING MELT-PROCESSING EQUIPMENT WITH A THERMOPLASTIC POLYOLEFIN AND A BIFUNCTIONAL SILOXANE

[75] Inventors: Ronald S. Nohr, Roswell; J. Gavin MacDonald, Decatur, both of Ga.

[73] Assignee: Kimberly-Clark Corporation, Neenah, Wis.

[21] Appl. No.: 475,568

[22] Filed: Feb. 6, 1990

Related U.S. Application Data

[63] Continuation-in-part of Ser. No. 202,275, Jun. 3, 1988, abandoned.

[51] Int. Cl.$^5$ .......................... B08B 7/00; B28B 7/04; C11D 7/26; C11D 7/60
[52] U.S. Cl. ........................................ 134/5; 134/7; 134/23; 134/38; 252/174.15; 252/174.23; 252/DIG. 2; 252/DIG. 3; 264/39
[58] Field of Search .................... 264/39; 134/5, 7, 23, 134/38; 252/174.15, 174.23, DIG. 2, DIG. 3

[56] References Cited

U.S. PATENT DOCUMENTS

| | | |
|---|---|---|
| Re. 32,514 | 10/1987 | Steklenski ............... 524/32 |
| 3,071,498 | 1/1963 | Kaskel .................... 134/7 |
| 3,119,720 | 1/1964 | Stiles et al. .............. 134/22 |
| 3,360,421 | 12/1967 | Sands ..................... 161/63 |
| 3,629,308 | 12/1971 | Bailey et al. ............ 260/448.2 |
| 3,766,115 | 10/1973 | Sands .................... 260/29.1 |
| 3,776,774 | 12/1973 | Miller ..................... 134/7 |
| 3,798,064 | 3/1974 | Amoser ................... 134/7 |
| 3,867,188 | 2/1975 | Campbell et al. ........ 117/138.8 |
| 3,929,509 | 12/1975 | Taskier .................. 136/146 |
| 3,973,068 | 8/1976 | Weber ..................... 28/198 |
| 4,070,218 | 1/1978 | Weber .................... 156/167 |
| 4,105,569 | 8/1978 | Crossfield .............. 252/8.6 |
| 4,150,013 | 4/1979 | Punderson .............. 260/42.26 |
| 4,226,817 | 10/1980 | Siegman ................. 264/39 |
| 4,426,203 | 1/1984 | Abel et al. ............... 8/138 |
| 4,444,563 | 4/1984 | Abel ....................... 8/588 |
| 4,446,090 | 5/1984 | Lovgren et al. ......... 264/211 |
| 4,480,009 | 10/1984 | Berger ................... 428/447 |
| 4,499,149 | 2/1985 | Berger ................... 428/447 |
| 4,500,659 | 2/1985 | Kroupa et al. .......... 523/213 |
| 4,535,113 | 8/1985 | Foster et al. ............ 524/262 |
| 4,563,190 | 1/1986 | Topfl ..................... 8/524 |
| 4,578,414 | 3/1986 | Sawyer et al. .......... 524/310 |
| 4,585,830 | 4/1986 | Sweet .................... 524/862 |
| 4,645,691 | 2/1987 | Ona et al. .............. 427/180 |
| 4,652,489 | 3/1987 | Cross et al. ............ 428/337 |
| 4,659,777 | 4/1987 | Riffle et al. ............. 525/100 |
| 4,672,005 | 6/1987 | Dyer ...................... 428/474.4 |
| 4,689,362 | 8/1987 | Dexter ................... 524/266 |
| 4,698,388 | 10/1987 | Ohmura et al. ......... 525/88 |
| 4,731,126 | 3/1988 | Dixit et al. ............. 134/38 |
| 4,745,142 | 5/1988 | Ohwaki et al. ......... 524/87 |

FOREIGN PATENT DOCUMENTS 1049682 2/1979 Canada .
0071349A 2/1982 European Pat. Off. .
62-176817A 8/1987 Japan .

OTHER PUBLICATIONS

A. J. Sabia and R. B. Metzler, *Nonwovens Ind.*, 14, 16 (1983).
*Chem. Abstr.*, 84:91066z, (1976).
*Chem. Abstr.*, 77:89559z, (1972).
R. H. Somani and M. T. Shaw, *Macromolecules*, 14, 886, (1981).
S. N. Pandit et al., *Polymer Compos.*, 2, 68, (1981).
"Silwet$_T$ Surface Active Copolymers", Bulletin SUI-394A, 7/85-5M, Union Carbide Corporation.
"Silicon Compounds Register and Review", Petrarch Systems Silanes and Silicons, pp. 253-300, Petratch Systems.
"Tegopren$_T$ Silicone Surfactants—Products, Data, Information", Th. Goldschmidt AG.
"Surfactants at Th. Goldschmidt AG", Th. Goldschmidt AG.
"Goldschmidt Informiert . . . ", 1/82, Nr. 56, Mar. 1982, English Edition, Th. Goldschmidt AG.
"Goldschmidt Informiert . . . ", 4/84, No. 63, Dec. 1984, Functional Oligomers, Th. Goldschmidt AG.
"Silwet$_T$ Surfactants", Bulletin SC-877, P8-2538, 2/88-10M, Union Carbide Corporation.

*Primary Examiner*—Dennis Albrecht
*Attorney, Agent, or Firm*—William E. Maycock

[57] ABSTRACT

A method of cleaning melt-processing equipment which comprises processing in such equipment a thermoplastic composition which comprises at least one thermoplastic polyolefin and at least one siloxane-containing additive having at least two moieties, A and B, in which:

(A) said additive is compatible with said polyolefin at melt extrusion temperatures but is incompatible at temperatures below melt extrusion temperatures, but each of moiety A and moiety B, if present as separate compounds, would be incompatible with said polyolefin at melt extrusion temperatures and at temperatures below melt extrusion temperatures;
(B) moiety A contains at least one tetrasubstituted disiloxanylene group;
(C) moiety B has at least one functional group which is a poly(oxyalkylene) moiety;
(D) the molecular weight of said additive is in the range of from about 400 to about 16,000; and
(E) said additive is present in said thermoplastic composition at a level of from about 3 to about 12 percent by weight, based on the weight of said thermoplastic polyolefin;

in which (1) said at least one thermoplastic polyolefin is not the same polymer as last employed in the melt-processing equipment to be cleaned, and (2) the amount of thermoplastic composition and the processing time are sufficient to clean said processing equipment.

15 Claims, No Drawings

METHOD OF CLEANING MELT-PROCESSING EQUIPMENT WITH A THERMOPLASTIC POLYOLEFIN AND A BIFUNCTIONAL SILOXANE

This is a continuation-in-part of application Ser. No. 07/202,275, filed on June 3, 1988 in the names of Ronald S. Nohr and J. Gavin MacDonald, now abandoned.

BACKGROUND OF THE INVENTION

The present invention relates to a method of cleaning melt-processing equipment. More particularly, the present invention relates to a method of cleaning equipment used to melt-process thermoplastic polymers.

Thermoplastic polymers find extensive commercial use in such products as coatings, including paints, stains, and insulating materials; adhesives; injection molded articles; fibers and fabrics; films, including both cast and blown films; and extruded articles. In many cases, such polymers are compounded and/or extruded in softened or molten form. All such processes are referred to herein collectively by the term "melt-process" and variations thereof.

In general, the need to clean melt-processing equipment is minimal when the same polymer is processed. Cleaning typically is not a problem with equipment in which, for example, only polypropylene is processed. When the same polymer type is used, compatibility or solubility factors are optimized. Thus, cleaning usually involves the simple expedient of allowing the first extrudate to be collected as waste.

The need to clean melt-processing equipment is greatest, however, when the polymeric composition employed changes either frequently or significantly. This is true for both batch and continuous processes. In either case, two general approaches have been employed in the past. In the first, a new polymeric composition is introduced into the melt-processing equipment without an intermediate cleaning step. In effect, the newly introduced composition becomes the cleaning agent, and material being extruded from the equipment is simply discarded until the extrudate specifications match those of the new composition. In the second, a separate cleaning step is carried out. Such step can consist of introducing into the equipment another polymeric material which functions as a cleaner. Alternatively, a cleaning agent can be passed through the equipment. If desired, a polymer can be introduced into the equipment to assist in the removal of the cleaning agent which often is an abrasive. The use of an abrasive not only fails to thoroughly clean many types of compounders and extruders, but also can cause extensive internal damage, particularly with repeated use or when close tolerances are required.

Surface-segregatable, melt-extrudable thermoplastic compositions are described and claimed in copending and commonly assigned application Ser. No. 07/181,359, entitled SURFACE-SEGREGATABLE, MELT-EXTRUDABLE THERMOPLASTIC COMPOSITION, filed on Apr. 14, 1988 in the names of Ronald S. Nohr and J. Gavin MacDonald. Such compositions are useful for modifying the surface characteristics of polymers in a unique and very efficient manner. Work with such thermoplastic compositions which contained a siloxane-based additive led to the surprising discovery that the compositions also are remarkably effective cleaners of melt-processing equipment. Related applications include the following: (1) copending and commonly assigned application Ser. No. 07/181,352, entitled STABILIZED SILOXANE-CONTAINING MELT-EXTRUDABLE THERMOPLASTIC COMPOSITIONS, filed Apr. 14, 1988 in the names of Ronald S. Nohr and J. Gavin MacDonald; (2) copending and commonly assigned application Ser. No. 07/181,624, entitled BENZOTRIAZOLYL-SUBSTITUTED SILOXANES, filed Apr. 14, 1988 in the names of Ronald S. Nohr and J. Gavin MacDonald, now abandoned; (3) copending and commonly assigned application Ser. No. 07/181,623, entitled TETRAALKYLPIPERIDYL-SUBSTITUTED SILOXANES, filed Apr. 14, 1988 in the names of Ronald S. Nohr and J. Gavin MacDonald, now abandoned; (4) copending and commonly assigned application Ser. No. 07/181,463, entitled SILOXANE CONTAINING BENZOTRIAZOLYL/TETRAALKYLPIPERIDYL SUBSTITUENT, filed Apr. 14, 1988 in the names of William E. Maycock, Ronald S. Nohr, and J. Gavin MacDonald, now U.S. Pat. No. 4,859,759; (5) copending and commonly assigned application Ser. No. 07/181,282, entitled METHOD OF FORMING A NONWOVEN WEB FROM A SURFACE-SEGREGATABLE THERMOPLASTIC COMPOSITION, filed Apr. 14, 1988 in the names of Ronald S. Nohr and J. Gavin MacDonald, now U.S. Pat. No. 4,857,251; and (6) co-pending and commonly assigned application Ser. No. 07/181,601, entitled METHOD OF FORMING A SPUNBONDED NONWOVEN WEB FROM A SURFACE-SEGREGATABLE THERMOPLASTIC COMPOSITION, filed Apr. 14, 1988 in the names of Ronald S. Nohr and J. Gavin MacDonald, now abandoned.

Various methods of modifying the surface characteristics of polymers are known. One method involves including a surfactant in the polymer which is to be melt-processed to form a nonwoven web, as disclosed in U.S. Pat. Nos. 3,973,068 and 4,070,218 to R. E. Weber. In that method, however, the surfactant must be forced to the surface of the fibers from which the web is formed. This typically is done by heating the web on a series of steam-heated rolls or "hot cans". This process, called "blooming", is expensive and still has the disadvantage of ready removal of the surfactant by aqueous media. Moreover, the surfactant has a tendency to migrate back into the fiber which adversely affects shelf life, particularly at high storage temperatures. In addition, it is not possible to incorporate into the polymer levels of surfactant much above 1 percent by weight because of severe processability problems; surfactant levels at the surface appear to be limited to a maximum of about 0.33 percent by weight.

Other methods of imparting wettability to, or otherwise affecting the surface characteristics of, shaped articles made from polyolefins and other hydrophobic polymers are known. Representative examples of a number of such methods are described in the paragraphs which follow.

U.S. Pat. No. 4,578,414 to L. H. Sawyer and G. W. Knight describes wettable olefin polymer fibers. The fibers are formed from a composition comprising a polyolefin resin and one or more defined surface-active agents. Such agents may be present in an amount of from about 0.01 to about 5 percent by weight. The surface-active agents can be (1) an alkoxylated alkyl phenol in combination with a mixed mono-, di-, and/or triglyceride; (2) or a polyoxyalkylene fatty acid ester; or (3) a combination of (2) with any part of (1). The preferred polyolefin is polyethylene, and all of the examples employed an ethylene/1-octene copolymer, the latter apparently being a minor component. The surface-active agents are stated to bloom to the fabricated fiber surfaces where at least one of the surface-active agents remains partially embedded in the polymer matrix. The patent further states that the permanence of wettability can be controlled through the composition and concentration of the additive package.

Polysiloxane/poly(oxazoline) block copolymers are disclosed in U.S. Pat. No. 4,659,777 to J. S. Riffle and I. Yilgor. The copolymers are stated to be useful as surface-modifying additives for base polymers. Such use apparently has primary reference to personal care products where the surface properties to be imparted include glossiness, smoothness, and lubricity. However, incorporation of the copolymers into fibers is stated to impart surface stain resistance, antistatic properties, flame retardancy, and wettability by both polar and nonpolar solvents. Such incorporation preferably is in the range of from about 1 to 5 parts by weight. Suitable base polymers include some vinyl polymers, acrylate polymers, polyurethanes, cellulose derivatives, and polyethylene, polypropylene, ethylenepropylene copolymers, and copolymers of ethylene with, for example, vinyl acetate. However, the single example illustrating incorporation of the disclosed copolymers into a base polymer employed as the base polymer poly(vinyl chloride), and the resulting mixture was used to cast films from solution.

U.S. Pat. No. 4,672,005 to M. E. Dyer describes a process for improving the hygroscopic, soil release, and other surface properties of a polymer substrate. The process involves contacting the substrate with an aqueous mixture containing a water-soluble vinyl monomer and a hydrophobic vinyl monomer. Polymerization of the water-soluble vinyl monomer then is initiated by a polymerization initiator, thereby forming a vinyl polymer on the surface of the polymer substrate.

U.S. Pat. No. 4,698,388 to H. Ohmura et al. describes a method for modifying the surface of a polymer material by means of a block copolymer. The block copolymer consists of a hydrophilic polymer portion formed from a vinyl monomer and a polymer portion which is compatible with the polymer material, also formed from a vinyl monomer. The block copolymer is added to the polymer material by, for example, coating the material with a solution or suspension of the block copolymer, mixing the block copolymer with the polymer material during formation of the article, forming a film from the block copolymer which then is melt-pressed or adhered to the surface of the polymer material, and coating the surface of the polymer material with powdered block copolymer.

Polymer compositions having a low coefficient of friction are described by U.S. Pat. No. Re. 32,514 to D. J. Steklenski. The compositions comprise a blend of at least 80 percent by weight of a polymer and at least 0.35 percent by weight of a crosslinked silicone polycarbinol. The polymer preferably is a blend of cellulose nitrate and a hydrophobic acrylate polymer. The silicone polycarbinol in general is a hydroxy-terminated polysiloxane or hydroxy-substituted polysiloxane. The compositions typically are prepared by dissolving the polymer or polymer blend, silicone polycarbinol, and crosslinking agent in a suitable solvent and casting a film from which the solvent is allowed to evaporate.

Canadian Patent No. 1,049,682 describes the inclusion in a thermoplastic polymer of from 0.1 to 10 percent by weight of a carboxy-functional polysiloxane. Suitable thermoplastic polymers include polyolefins. Such inclusion is stated to enhance the properties or characteristics of the thermoplastic polymer in one or more ways. By way of illustration, products or articles made from the polymer mixture were stated to have self-lubricating properties and increased resistance to wear. For molded articles, less friction during transfer, injection or extrusion molding was observed, and better release of parts from the molds was obtained. See, also, German Published Patent Application (Offenlegungschrift) No. 2,506,667 [*Chem. Abstr.*, 84:91066z (1976)].

Other, similar references which may be of interest include R. H. Somani and M. T. Shaw, *Macromolecules*, 14, 886 (1981), which describes the miscibility of polydimethylsiloxane in polystyrene; and S. N. Pandit et al., *Polym. Compos.*, 2, 68 (1981), which reports the use of a vinyltriethoxysilane polymer as a coupling agent in glass fiber-reinforced polypropylene.

It also may be noted that polysiloxanes have been utilized in the production of nonwoven webs or fabrics, or products made therefrom, as illustrated by the references which follow.

U.S. Pat. No. 3,360,421 to S. Sands describes a bonded nonwoven backing material having perforate selvage which is used in the manufacture of carpet. In the production of the nonwoven backing material, a nonwoven web is produced from a polyolefin such as polyethylene or polypropylene. The resulting web then is subjected to bonding conditions, followed by applying to the web a lubricant which can be, among other things, methyl hydrogen polysiloxane and dimethyl polysiloxane.

A finish composition for application to a continuous filament polypropylene sheet is disclosed in U.S. Pat. No. 3,766,115 to S. Sands. The composition comprises a mixture of two polysiloxane components, the first of which is a dyeable component comprising a primary or secondary amino- alkyl- or aminoalkoxyalkylpolysiloxane fluid having an amine functionality in the range of 4-7 percent and being substantially free of other reactive groups. The second component is a lubricant component comprising a polydialkyl/arylsiloxane fluid having hydroxy end groups and being substantially free of other reactive groups. The polypropylene sheet typically is a spunbonded sheet made from isotactic polypropylene.

U.S. Pat. No. 3,867,188 to P. E. Campbell and J. G. Kokoszka relates to a spunbonded nonwoven fabric which is especially useful as a carpet backing. The fabric has on it a silicone-glycol copolymer having the general formula:

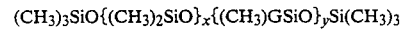

in which G is a radical of the structure —R(C$_3$H$_6$)$_z$OH, R is an alkylene radical containing from 1 to 18 carbon atoms, x has an average value of from 40-90, y has an average value of from 1-10, and z has an average value of from 1-10.

U.S. Pat. No. 3,929,509 to H. T. Taskier describes a hydrophilic microporous film which is useful as a battery separator. The film comprises a hydrophobic microporous film coated with a silicone glycol copolymer surfactant, preferably at a level of from 2 to 20 percent by weight, based on the uncoated film. In preferred embodiments, the surfactant coating comprises a mixture of a silicone glycol copolymer surfactant and a second surfactant which preferably is an imidazoline tertiary amine. The silicone glycol copolymer surfactant preferably is a polyoxyethylene polymethylsiloxane.

A yarn finish formulation is disclosed in U.S. Pat. No. 4,105,569 to R. J. Crossfield. In preferred embodiments, the formulation contains a hydrocarbon-soluble, long molecular chain polymeric viscosity improver, such as polyisobutylene, and a polysiloxane. Preferably, the polysiloxane is an alkoxylated polysiloxane, such as a dimethylpolysiloxane with substituted polyethylene glycol or polypropylene glycol side chains or mixed polyethylene/polypropylene glycol side chains.

U.S. Pat. No. 4,563,190 to R. Topfl describes a siloxane/oxyalkylene copolymer as an optional component of a dyeing assistant for dyeing or printing polyamide fiber material with anionic dyes. See also U.S. Pat. Nos. 4,444,563 to H. Abel and 4,426,203 to H. Abel and J. Oxe.

U.S. Pat. No. 4,645,691 to I. Ona and M. Ozaki describes a method for treating materials with organopolysiloxane compounds. The method involves applying to the material a composition containing a silicone compound which has one or more alkoxysilylalkyl groups and one or more polyoxyalkylene groups. The materials to be treated preferably are fibers and fiber-containing materials.

For a limited review of similar applications of silicones, see A. J. Sabia and R. B. Metzler, *Nonwovens Ind.*, 14, 16 (1983). Also note British Patent No. 1,273,445 [*Chem. Abstr.*, 76: 89559z (1972)], which describes the use of a block polysiloxane, among other materials, in the preparation of a leather substitute.

It may be noted that the above review briefly discusses polysiloxanes which have been modified by inclusion of a poly(oxyalkylene) moiety; such modified polysiloxanes can be employed in the composition of the present invention as an additive.

A modified polysiloxane in which the poly(oxyalkylene) moiety is a poly(oxypropylene) is described in U.S. Pat. No. 3,867,188 to P. E. Campbell and J. G. Kokoszka. The modified polysiloxane apparently is employed as a lubricant which coats a spunbonded nonwoven fabric. The fabric, in turn, is employed as a carpet backing. The addition of the modified polysiloxane to the backing is stated to reduce damage to the backing which results from the tufting process used to manufacture the carpet.

Additionally, polysiloxanes have been used in the manufacture of films. For example, U.S. Pat. No. 4,652,489 describes a sealable, opaque polyolefinic multilayer film. The film is composed of a polypropylene base layer, a nonsealable surface layer, and a sealable surface layer. The nonsealable layer is a combination of a propylene homopolymer and a slip agent which preferably is a polydiorganosiloxane. The polydiorganosiloxane is used in an amount of from about 0.3 to about 2.5 percent by weight and preferably comprises a polymethylphenylsiloxane or a polydimethylsiloxane.

Finally, several references are known which are or may be of interest in relation to the additive when it contains disubstituted siloxane groups. Such references are described below.

Siloxane-oxyalkylene block copolymers are disclosed in U.S. Pat. No. 3,629,308 to D. L. Bailey and A. S. Pater. The copolymers are stated to be particularly useful as a foam stabilizer in the production of polyurethane resin foams. The copolymers are represented by the formula:

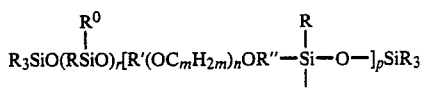

in which R is a monovalent hydrocarbon group, $R^0$ is hydrogen or a monovalent hydrocarbon group, $R'$ is hydrogen or a monovalent hydrocarbon group, $R''$ is a divalent hydrocarbon group, r has a value of at least 0, m is an integer that has a value of at least 2, n is a number that has a value of at least 1 (preferably at least 4), p is a number that has a value of at least 1, there are not more than three hydrogen atoms represented by $R^0$ in the copolymer (preferably less than one or none), and at least 25 weight-percent of the groups represented by $(OC_mH_{2m})$ are oxyethylene groups.

U.S. Pat. No. 4,150,013 to J. O. Punderson describes melt-processible tetrafluoroethylene copolymers containing organopolysiloxanes which are useful as wire insulation coatings. The organopolysiloxane is present in an amount of between about 0.2 and 5 percent by weight, based on the weight of the resulting copolymer composition. Representative organopolysiloxanes include polyphenylmethylsiloxane, polydimethylsiloxane, polymethylsiloxane, a copolymer of phenylmethylsiloxane and dimethylsiloxane, and the like.

A high viscosity silicone blending process is disclosed in U.S. Pat. No. 4,446,090 to E. M. Lovgren et al. The blends produced by the process are stated to have engineering properties and flame retardance superior to known blends. The process involves (a) melting a solid thermoplastic composition comprising one or more thermoplastic polymers within an extruder, (b) injecting a high viscosity silicone fluid into the molten thermoplastic composition within the extruder, and (c) blending said molten thermoplastic composition with said high viscosity silicone fluid within the extruder. The thermoplastic compositions include polyethylene and polypropylene. The silicone fluid typically is a polydimethylsiloxane. The blend can contain such additives as reinforcing fillers, antioxidants, lubricants, flame retardants, and the like. The additives can be introduced by means of the thermoplastic polymers, the silicone fluid, or both. Typical flame retardants include magnesium stearate, calcium stearate, barium stearate, antimony oxide, and decabromodiphenyloxide.

Siloxane-containing polymers are described in U.S. Pat. Nos. 4,480,009 and 4,499,149 to A. Berger. The properties of polymeric compositions are stated to be improved by the presence of a polysiloxane unit having a defined formula. The listing of polymers, however, does not include polyolefins. The disclosed compositions apparently are useful as protective coatings and as molding, extruding, laminating, and calendaring compositions. Solutions of the compositions can be used to prepare films and fibers.

U.S. Pat. No. 4,500,659 to L. A. Kroupa and E. H. Relyea relates to extrudable, curable polyorganosiloxane compositions. The compositions are similar to those of U.S. Pat. No. 4,585,830, described below. In the present case, the compositions comprise (A) a liquid triorganosiloxy endblocked polydimethylsiloxane wherein the triorganosiloxy units are dimethylvinylsiloxy or methylphenylvinylsiloxy; (B) a reinforcing silica filler which has been reacted with a liquid or solubilized treating agent, at least one component of which is a liquid hydroxy end-blocked polyorganosiloxane wherein at least 50 percent of the silicon atoms are bonded to a fluorine-substituted hydrocarbon radical; (C) a liquid methylhydrogensiloxane having an average of at least three silicon-bonded hydrogen atoms per molecule; and (D) a platinum-containing catalyst. The bonded treating agent for the silica filler would be incompatible, i.e., insoluble, with the polydimethylsiloxane component if it were not bonded to the silica.

Olefin polymer compositions containing silicone additives are described in U.S. Pat. No. 4,535,113 to G. N. Foster and R. B. Metzler. The compositions apparently can be extruded through relatively narrow die gaps at commercial extrusion rates to provide films having improved optical and mechanical properties. The silicone additives have the formula,

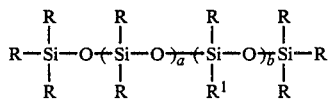

in which each R, which can be the same or different, is an alkyl radical preferably having from one to six carbon atoms, $R^1$ is a monovalent organic radical containing at least one ethyleneoxide group, vicinal epoxy group, or amino group, and a and b, which can be the same or different, each have a value of at least 1 and generally have a value of from about 4 to about 5,000. The silicone additives typically are present in the compositions in an amount of from about 0.01 to about 5 percent by weight.

U.S. Pat. No. 4,585,830 to R. P. Sweet describes polyorganosiloxane compositions useful for preparing unsupported extruded profiles. Such compositions are stated to include a triorganosiloxy end-blocked polydiorganosiloxane containing at least two vinyl radicals per molecule, in which at least 50 percent of the silicon-bonded organic radicals are methyl; and an organohydrogensiloxane containing at least two silicon-bonded hydrogen atoms per molecule, in which said hydrogen atoms are bonded to different silicon atoms. Examples of such two types of compounds are dimethylvinylsiloxy end-blocked polydimethylsiloxanes and trimethylsiloxy end-blocked dimethylsiloxane/methylhydrogensiloxane copolymers, respectively.

SUMMARY OF THE INVENTION

As already stated, work with the surface-segregatable, melt-extrudable thermoplastic compositions described in application Ser. No. 07/181,359 which contained a siloxane-based additive led to the surprising discovery that the compositions also are remarkably effective cleaners of melt-processing equipment.

Accordingly, the present invention provides a method of cleaning melt-processing equipment which comprises processing in such equipment a thermoplastic composition which comprises at least one thermoplastic polyolefin and at least one siloxane-containing additive having at least two moieties, A and B, in which:

(A) said additive is compatible with said polyolefin at melt extrusion temperatures but is incompatible at temperatures below melt extrusion temperatures, but each of moiety A and moiety B, if present as separate compounds, would be incompatible with said polyolefin at melt extrusion temperatures and at temperatures below melt extrusion temperatures;

(B) moiety A contains at least one tetrasubstituted disiloxanylene group;

(C) moiety B has at least one functional group which is a poly(oxyalkylene) moiety;

(D) the molecular weight of said additive is in the range of from about 400 to about 16,000; and (E) said additive is present in said thermoplastic composition at a level of from about 3 to about 12 percent by weight, based on the weight of said thermoplastic polyolefin;

in which (1) said at least one thermoplastic polyolefin is not the same polymer as last employed in the melt-processing equipment to be cleaned, and (2) the amount of thermoplastic composition and the processing time are sufficient to clean said processing equipment.

In preferred embodiments, the substituents of the tetrasubstituted disiloxanylene group independently are selected from the group consisting of trisubstituted silyl and trisubstituted siloxy groups. The substituents of such trisubstituted silyl and trisubstituted siloxy groups in turn are independently selected from the group consisting of monovalent alkyl, cycloalkyl, aryl, and heterocyclic groups, each of which may be substituted or unsubstituted.

In other preferred embodiments, the siloxane additive contains a plurality of groups selected from the group represented by the following general formulae:

(1) $B_1-$,
(2) $B_2-O-$,
(3) $R_1-$,
(4) $R_2-Si\equiv$
(5) $(R_3)(R_4)(R_5)Si-$,
(6) $(R_6)(R_7)(R_8)Si-O-$,
(7) $[-Si(R_9)(R_{10})-O-]_a$, and
(8) $[-Si(R_{11})(B_3)-O-]_b$;

in which each of $R_1$ and $R_2$ independently is a monovalent group selected from the group consisting of hydrogen, alkyl, cycloalkyl, aryl, and heterocyclic groups, each of which, except for hydrogen, may be substituted or unsubstituted; each of $R_3-R_5$, inclusive, independently is a monovalent group selected from the group consisting of alkyl, cycloalkyl, aryl, and heterocyclic groups, each of which may be substituted or unsubstituted, and $B_4$; each of $R_6-R_{11}$, inclusive, independently is a monovalent group selected from the group consisting of alkyl, cycloalkyl, aryl, and heterocyclic groups, each of which may be substituted or unsubstituted; each of a and b independently represents an integer from 0 to about 160 which indicates only the quantity of the respective group present in the additive without indicating or requiring, in instances when an integer is greater than 1, that such plurality of the respective group are connected to one another to form an oligomer or polymer or that all of such groups have identical substituents; and each of $B_1-B_4$, inclusive, independently is a poly(oxyalkylene) moiety; with the proviso that such plurality of groups results in at least one tetrasubstituted disiloxanylene group.

In yet other preferred embodiments, the siloxane additive is represented by the general formula,

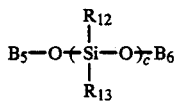

in which each of $R_{12}$ and $R_{13}$ independently is a monovalent group selected from the group consisting of hydrogen, alkyl, cycloalkyl, aryl, and heterocyclic groups, each of which, except for hydrogen, may be substituted or unsubstituted; each of $B_5$ and $B_6$ independently is a poly(oxyalkylene) moiety; and c represents an integer from 2 to about 160.

In still other preferred embodiments, the siloxane additive is represented by the general formula,

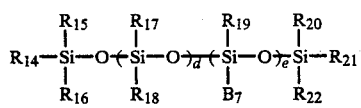

in which each of $R_{14}$–$R_{22}$, inclusive, independently is a monovalent group selected from the group consisting of hydrogen, alkyl, cycloalkyl, aryl, and heterocyclic groups, each of which, except for hydrogen, may be substituted or unsubstituted; $B_7$ is a poly(oxyalkylene) moiety; and each of d and e independently represents an integer from 1 to about 160.

In yet other preferred embodiments, the siloxane additive is represented by the general formula,

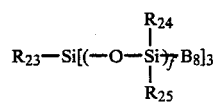

in which each of $R_{23}$–$R_{25}$, inclusive, independently is a monovalent group selected from the group consisting of hydrogen, alkyl, cycloalkyl, aryl, and heterocyclic groups, each of which, except for hydrogen, may be substituted or unsubstituted; $B_8$ is a poly(oxyalkylene) moiety; and f represents an integer from 1 to about 160.

The method of the present invention is useful for cleaning all types of melt-processing equipment, including, but not limited to, both batch and continuous equipment, such as mixers, compounders, blenders, extruders, meltblowing apparatus, spunbonding apparatus, coforming apparatus, meltspinning apparatus, and the like.

DETAILED DESCRIPTION OF THE INVENTION

The key to the method of the present invention is the use of a thermoplastic composition in the equipment to be cleaned, which composition comprises at least one thermoplastic polyolefin and at least one siloxane-containing additive having at least two moieties, A and B, in which:

(A) moiety A and moiety B act as a single molecular unit which is compatible with said polymer at melt extrusion temperatures but is incompatible at temperatures below melt extrusion temperatures, but each of moiety A and moiety B, taken as separate molecular units, is incompatible with said polymer at melt extrusion temperatures and at temperatures below melt extrusion temperatures;

(B) moiety A contains at least one tetrasubstituted disiloxanylene group;

(C) moiety B has at least one functional group which is a poly(oxyalkylene) moiety;

(D) the molecular weight of said additive is in the range of from about 400 to about 16,000; and (E) said additive is present in said thermoplastic composition at a level of from about 3 to about 12 percent by weight, based on the weight of said thermoplastic polymer.

In general, the term "thermoplastic polyolefin" is used herein to mean any thermoplastic polyolefin which can be meltprocessed. Examples of such thermoplastic polyolefins include, by way of illustration only, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; and copolymers of the foregoing, such as acrylonitrilebutadiene-styrene (ABS) copolymers, and the like. The term "thermoplastic polyolefin" is meant to include blends of two or more polyolefins. The term also includes random and block copolymers which can involve either similar or dissimilar monomers or blocks.

The preferred polyolefins are those polyolefins which contain only hydrogen and carbon atoms and which are prepared by the addition polymerization of one or more unsaturated monomers. Examples of such preferred polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. Because of their commercial importance, the most preferred polyolefins are polyethylene and polypropylene.

Broadly stated, the additive must have at least two moieties, A and B, in which:

(A) moiety A and moiety B act as a single molecular unit which is compatible with said polymer at melt extrusion temperatures but is incompatible at temperatures below melt extrusion temperatures, but each of moiety A and moiety B, taken as separate molecular units, is incompatible with said polymer at melt extrusion temperatures and at temperatures below melt extrusion temperatures; and (B) moiety B has at least one functional group which is a poly(oxyalkylene) moiety.

It should be apparent that the additive can be monomeric, oligomeric, or polymeric. Indeed, polymeric additives are required in order to achieve the higher additive molecular weights permitted by the present invention. Because lower additive molecular weights are preferred, the preferred additives perhaps are properly referred to as oligomers. However, such nomenclature can be misleading and reliance instead should be placed on the molecular weight of the additive and the other parameters already described. It is for this reason that the additive is not referred to as a polymeric additive, even though in many instances the additive will be oligomeric or polymeric in nature.

The additive is a material which will be referred to herein loosely as a siloxane. That is, moiety A will comprise at least one tetrasubstituted disiloxanylene group, the substituents of which being selected from the group consisting of trisubstituted silyl and trisubstituted siloxy groups. Such trisubstituted silyl and trisubstituted siloxy groups in turn are substituted with groups independently selected from the group consisting of monovalent alkyl, cycloalkyl, aryl, and heterocyclic groups, each of which may be substituted or unsubstituted. As a practical matter, moiety A often will consist of all three groups; i.e., moiety A typically will comprise a tetrasubstituted disiloxanylene group substituted with both trisubstituted silyl and trisubstituted siloxy groups. Moreover, more than one tetrasubstituted disiloxanylene group often will be present, particularly when the additive has an appreciable molecular weight.

As noted, the substituents of the trisubstituted silyl and/or trisubstituted siloxy groups comprising moiety A can be alkyl, cycloalkyl, aryl, or heterocyclic groups which may be the same or different and which in turn may be substituted or unsubstituted. Other than the obvious requirement that such substituents not adversely affect additive stability or other properties, there are no known limitations to such substituents. However, for reasons relating primarily to commercial availability and ease of synthesis, such substituents preferably are alkyl groups and more preferably are unsubstituted alkyl groups having from 1 to 3 carbon atoms. Most preferably, such substituents are methyl groups.

More specifically, the additive preferably contains a plurality of groups selected from the group represented by the following general formulae, it being understood that not all groups need to be present and that the presence of some groups precludes the presence of others:
(1) $B_1$—,
(2) $B_2$—O—,
(3) $R_1$—,
(4) $R_2$—Si≡,
(5) $(R_3)(R_4)(R_5)$Si—,
(6) $(R_6)(R_7)(R_8)$Si—O—,
(7) $[-Si(R_9)(R_{10})-O-]_a$, and
(8) $[-Si(R_{11})(B_3-O-]_b$; in which each of $R_1$ and $R_2$ independently is a monovalent group selected from the group consisting of hydrogen, alkyl, cycloalkyl, aryl, and heterocyclic groups, each of which, except for hydrogen, may be substituted or unsubstituted; each of $R_3$-$R_5$, inclusive, independently is a monovalent group selected from the group consisting of alkyl, cycloalkyl, aryl, and heterocyclic groups, each of which may be substituted or unsubstituted, and $B_4$; each of $R_6$-$R_{11}$, inclusive, independently is a monovalent group selected from the group consisting of alkyl, cycloalkyl, aryl, and heterocyclic groups, each of which may be substituted or unsubstituted; each of a and b independently represents an integer from 0 to about 160 which indicates only the quantity of the respective group present in the additive without indicating or requiring, in instances when an integer is greater than 1, that such plurality of the respective group are connected to one another to form an oligomer or polymer or that all of such groups have identical substituents; and each of $B_1$-$B_4$, inclusive, independently is a poly(oxyalkylene) moiety; with the proviso that such plurality of groups results in at least one tetrasubstituted disiloxanylene group.

Molecular weight limitations, if desired, are readily achieved by limiting the sum of a and b to the extent required to achieve the desired molecular weight.

In general, the preparation of the siloxane moiety is well known to those having ordinary skill in the art. Siloxanes that have reactive groups, such as H—Si≡, RO—Si≡, and Cl—Si≡, are used as starting products. Such materials are prepared either by hydrolysis of, e.g., methylchlorosilanes or by copolymerization of cyclic or linear polymethylsiloxanes with functional siloxanes. See, for example, W. Noll, "Chemistry and Technology of Silicones," Academic Press, New York, 1968; and R. Meals, "Encyclopedia of Chemical Technology," Vol. 18, 2nd Edition, 1969, p.221.

Turning now to moiety B, the point of attachment to moiety A is not known to be critical. For example, moiety B can be a substituent of any one or more of the tetrasubstituted disiloxanylene, trisubstituted silyl, and trisubstituted siloxy groups which may be present.

As already stated, moiety B is a poly(oxyalkylene) moiety. More preferably, the alkylene portion of such moiety will contain from 2 to about 6 carbon atoms. Most preferably, moiety B is a poly(oxyalkylene) moiety in which the oxyalkylene repeating units are oxyethylene or oxypropylene or a mixture thereof. When both oxyethylene and oxypropylene repeating units are present, the ratio of oxyethylene repeating units to oxypropylene repeating units preferably is from about 10:1 to about 1:10, and most preferably from about 5:1 to about 2:1.

References which disclose polysiloxanes containing one or more poly(oxyalkylene) moieties suitable for use as the additive include, among others, U.S. Pat. Nos. 2,836,748, 2,917,480, 2,991,300, 2,991,301, 3,168,543, 3,172,899, 3,236,252, 3,278,485, 3,280,160, 3,299,113, 3,356,758, 3,402,192, 3,480,583, 3,505,377, 3,509,192, 3,530,159, 3,600,418, and Re. 27,541; Belgian Patent No. 627,281; British Patent Nos. 892,819, 954,041, 963,437, 981,811, 981,812, 1,073,368, and 1,098,646; French Patent Nos. 1,259,241, 1,356,962, 1,411,757, 1,413,125, 1,482,133, 1,511,661, 1,520,444, and 1,179,743; German Published Specification (Offenlegungschrift) Nos. 1,495,927, 1,570,656, 1,595,730, 2,045,360, and 2,555,053; German Patent Nos.1,235,594, 1,257,433, 1,301,576, 1,570,647, and 1,195,953.

By way of illustration only, three types of additives, referred to hereinafter as types A, B, and C, respectively, are described below with reference to the plurality of preferred groups described earlier. In each case, moiety B is an oxyalkylene-containing moiety which is represented by the following general formula:

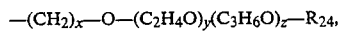

$$-(CH_2)_x-O-(C_2H_4O)_y(C_3H_6O)_z-R_{24},$$

in which $R_{24}$ is a monovalent group selected from the group consisting of hydrogen and lower alkyl; x represents an integer from 0 to about 3; and each of y and z independently represents an integer from 0 to about 100 which indicates only the quantity of the respective group present in the additive without indicating or requiring, in instances when an integer is greater than 1, that such plurality of the respective group are connected to one another to form an oligomer or polymer.

Type A Additives

The first type, which is most preferred, consists of groups of formulae 1, 2, and 7, in which each of $R_9$ and $R_{10}$ independently is an alkyl group containing from 1 to 3 carbon atoms; $R_{24}$ is an alkyl group containing from 1 to 4 carbon atoms; a is in the range of from 3 to about 60; x is 0; y is in the range of from about 5 to about 25; and z is in the range of from about 0 to about 25.

Specific examples of type A additives, by way of illustration only, include materials having the following general formula:

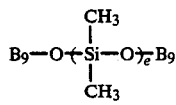

in which $B_9$ is $-(C_2H_4O)_y(C_3H_6O)_z-R_{24}$, where e, y, z, and $R_{24}$ are as already defined.

Commercially available additives of this type include TEGOPREN BC-1781, in which e has an average value of 5.5, $R_{24}$ is n-butyl (abbreviated in the tables as n-Bu), and the ethylene oxide/propylene oxide weight percent ratio in $B_9$ is 40/60; TEGOPREN D-985, in which e has an average value of 4.3, $R_{24}$ is methyl, and the ethylene oxide/propylene oxide weight percent ratio in $B_9$ is 70/30; and TEGOPREN V-337, in which e has an average value of 4, $R_{24}$ is methyl, and the ethylene oxide/propylene oxide weight percent ratio in $B_9$ is 100/0.

Type A additives in general are prepared by heating silicon with, e.g., chloromethane in the presence of a copper catalyst at about 300° C. to give dichlorodimethyl silane (see, e.g., U.S. Pat. No. 2,380,995 to E. G. Rochow) which, when reacted with water, gives a polymer having the following general formula:

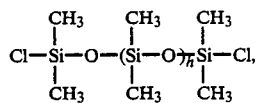

where h is an integer representing the number of repeating units in the molecule. See, for example, B. B. Hardman and A. Torkelson, "Encyclopedia of Chemical Technology," 3rd Edition, John Wiley & Sons, Inc., New York, 1982, pp. 922-962. The polymer then is reacted in the presence of trifluoroacetic acid with an oxyalkylene-containing compound having the general formula, $$HO-(C_2H_4O)_y(C_3H_6O)_z-R_{24}$$

in which $R_{24}$, y, and z are as already defined, to give the additive. See U.S. Pat. No. 2,836,748 to D. L. Bailey and F. M. O'Connor. See also U.S. Pat. No. 2,917,480, U.S. Pat. No. 3,505,377 to E. L. Morehouse, and German Patent No. 1,259,241.

Type B Additives

The second type of additives consists of groups of formulae 5-8, inclusive, in which each of $R_3-R_{11}$, inclusive, independently is an alkyl group containing from 1 to 3 carbon atoms; $R_{24}$ is an alkyl group containing from 1 to 4 carbon atoms; c is in the range of from about 3 to about 30; d is in the range of from about 1 to about 10; x is 3; y is in the range of from about 5 to about 25; and z is in the range of from about 0 to about 25.

Specific examples of type B additives, also by way of illustration only, include materials having the following general formula:

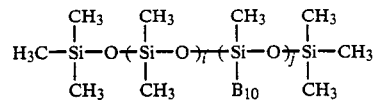

in which $B_{10}$ is $-(CH_3)_3-O-(C_2H_4O)_y(C_3H_6O)_zR_{24}$, where $R_{24}$, y, and z are as already defined, i represents an integer from 0 to about 100, and j represents an integer from 1 to about 100.

Commercially available examples of this type include SILWET L-77, SILWET L-7500, and SILWET L-7602 (Union Carbide Corporation, Danbury, Connecticut). Other commercially available examples include TEGOPREN 5843, in which the i/j value is 13/5, $R_{24}$ is hydrogen, and the ethylene oxide/propylene oxide weight percent ratio in $B_{10}$ is 100/0; TEGOPREN 5847, in which the i/j value is 0/1, $R_{24}$ is hydrogen, and the ethylene oxide/propylene oxide weight percent ratio in $B_{10}$ is 80/20; TEGOPREN 5852, in which the i/j value is 20/5, $R_{24}$ is hydrogen, and the ethylene oxide/propylene oxide weight percent ratio in $B_{10}$ is 20/80; TEGOPREN 5863, in which $R_{24}$ is hydrogen and the ethylene oxide/propylene oxide weight percent ratio in $B_{10}$ is 40/60; TEGOPREN 5873, in which the i/j value is 20/5, $R_{24}$ is hydrogen, and the ethylene oxide/propylene oxide weight percent ratio in $B_{10}$ is 35/65; and TEGOPREN 5878, in which $R_{24}$ is hydrogen and the ethylene oxide/propylene oxide weight percent ratio in $B_{10}$ is 100/0 (Th. Goldschmidt AG, Essen, Federal Republic of Germany).

The synthesis of the type B additives begins with a reactive silicon fluid, prepared by known methods, such as that represented by the following formula:

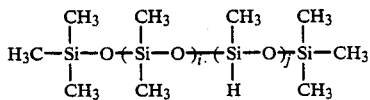

in which i and j are as already defined. The fluid is reacted with a compound having the general formula, $$CH_2=CHCH_2-O-(C_2H_4O)_y(C_3H_6O)_zR_{24}$$

in which $R_{24}$, y, and z are as already defined, to give the additive. The reaction is carried out in the presence of a platinum/$\tau$-aluminum oxide catalyst at a temperature of the order of 150° C. See, e.g., U.S. Pat. No. 3,280,160 to D. L. Bailey and U.S. Pat. No.3,505,377 to E. L. Morehouse. The compound which is reacted with the silicone fluid is obtained by the condensation of ethylene oxide and propylene oxide with allyl alcohol in the presence of a catalytic amount of potassium hydroxide, a well-known reaction.

Type C Additives

The third, and last, type of additives consists of groups of formulae 2, 4, and 7, in which each of $R_2$, $R_9$, and $R_{10}$ independently is an alkyl group containing from 1 to 3 carbon atoms; $R_{24}$ is an alkyl group containing from 1 to 4 carbon atoms; c is in the range of from 0 to about 50; x is 0; y is in the range of from about 5 to about 25; and z is in the range of from about 0 to about 25.

Specific examples of type C additives, again by way of illustration only, include materials having the following general formula:

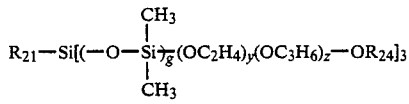

in which $R_{21}$ and $R_{24}$ are lower alkyl groups, g is as already defined, and each of y and z represents an integer from 0 to about 70.

A specific commercially available example is SILWET L-720 (Union Carbide Corporation, Danbury, Conn.).

Type C additives are prepared by the method described in U.S. Pat. No. 2,836,748 to D. L. Bailey and F. M. O'Connor. Briefly, methyltriethoxysilane and mixed cyclic polydimethylsiloxanes are heated at about 150° C. in the presence of potassium hydroxide as catalyst to give a material having the following general formula:

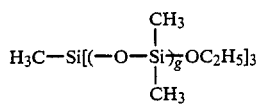

in which g is as already defined. This material then is reacted in the presence of trifluoroacetic acid with an oxyalkylene-containing compound having the general formula,

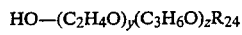

where y, z, and $R_{24}$ are as already defined, to give the additive.

The molecular weight of the additive generally will be in the range of from about 400 to about 16,000. Preferably, the additive will have a molecular weight in the range of from about 400 to about 10,000. More preferably, the molecular weight of the additive will be in the range of from about 400 to about 3,000. Most preferably, the additive will have a molecular weight in the range of from about 400 to about 1,000.

In general, the amount of additive in the thermoplastic composition can range from about 3 percent by weight to about 12 percent by weight, based on the weight of thermoplastic polyolefin. Preferably, additive will be present in the composition at a level of from about 3 to about 5 percent by weight.

The thermoplastic composition employed in the method of the present invention can be prepared by any number of methods known to those having ordinary skill in the art. For example, the polyolefin in chip or pellet form and the additive can be mixed mechanically to coat the polymer particles with additive. If desired, the additive can be dissolved in a suitable solvent to aid the coating process, although the use of a solvent is not preferred. The coated polymer then can be added to the feed hopper of the melt-processing equipment to be cleaned. In another method, the additive can be metered into the throat of the hopper which contains the polyolefin in particulate form and which feeds the melt-processing equipment. In yet another method, the additive can be metered directly into the barrel of the melt-processing equipment where it is blended with molten polyolefin.

Alternatively, the coated polymer can be charged to a heated compounder, such as a heated twin-screw compounder, in order to disperse the additive throughout the bulk of the polymer. The thermoplastic composition typically is extruded as rods which are fed to a chipper. The resulting chips then serve as the feed stock for a melt-processing apparatus.

As already noted, the need to clean melt-processing equipment is minimal when the same polymer is processed. Cleaning typically is not a problem with equipment in which, for example, only polypropylene is processed. When the same polymer type is used, compatibility or solubility factors are optimized. Thus, cleaning usually involves the simple expedient of allowing the first extrudate to be collected as waste. It is for this reason that the remarkable and unexpected cleaning ability of the compositions disclosed herein have not previously been recognized.

Also as already noted, the need to clean melt-processing equipment is greatest when the polymeric composition employed changes either frequently or significantly. This is true for both batch and continuous processes. In either case, two general approaches have been employed in the past. In the first, a new polymeric composition is introduced into the melt-processing equipment without an intermediate cleaning step. In effect, the newly introduced composition becomes the cleaning agent, and material being extruded from the equipment is simply discarded until the extrudate specifications match those of the new composition. This procedure often is not effective, especially when the polymeric portion of the old composition and the new composition are of different types. In the second, a separate cleaning step is carried out. Such step can consist of introducing into the equipment another polymeric material which functions as a cleaner. Alternatively, a cleaning agent can be passed through the equipment. If desired, a polymer can be introduced into the equipment to assist in the removal of the cleaning agent which often is an abrasive. The use of an abrasive not only fails to thoroughly clean many types of compounders and extruders, but also can cause extensive internal damage, particularly with repeated use or when close tolerances are required.

As pointed out in the examples to follow, the equipment typically employed to prepare the compositions which were used in the method of the present invention was a commercially available compounder. The unit typically was employed to prepare colored or pigmented polymers. Thus, the unit not only had been used with polymers different from the polyolefins utilized by Applicants, but the unit also had markers in the form of pigments which made it easy to determine visually the effectiveness of any given cleaning composition.

The present invention is further described by the examples which follow. Such examples, however, are not to be construed as limiting in any way either the spirit or scope of the present invention. In the examples, all temperatures are in degrees Celsius and all parts are by weight unless stated otherwise.

EXAMPLES

For convenience, the examples are divided into two sections describing (1) the additives and polymers employed and (2) the use of thermoplastic compositions in the method of the present invention.

I. DESCRIPTIONS OF ADDITIVES AND POLYOLEFINS

A. Additives

Each of the additives employed in the examples was a type A, B, or C additive. The additives per se are summarized in Tables 1, 3, and 5; if an additive were commercially available, the material designation or catalog number is given in the column labeled "I.D." and a manufacturer code is given in the column labeled "Source". The properties of the additives identified in Tables 1, 3, and 5 are summarized in Tables 2, 4, and 6, respectively.

TABLE 1

Type A Additive $$R_{24}O-(C_2H_4O)_y(C_3H_6O)_z-(Si-O)_e(C_3H_6O)_z(C_2H_4O)_yR_{24}$$
with $CH_3$ side groups on Si

| Additive Code | $R_{24}$ | e | z | y | MW | I.D. | Source |
|---|---|---|---|---|---|---|---|
| A01 | NA[a] | NA | NA | NA | 2400 | PS-555 | PS[b] |

[a]Not available.
[b]Petrarch Systems, Bristol, Pennsylvania.

TABLE 2

Properties of the Type A Additive of Table 1

| Code | Viscosity[a] | Cloud Point[b] | Surface Tension[c] |
|---|---|---|---|
| A01 | 320 | NA[d] | NA |

[a]In centistokes at 25° C.
[b]In degrees C., of a 1 percent by weight aqueous solution.
[c]In dynes/cm, ± 1.5, of a 1 percent by weight aqueous solution.
[d]Not available.

TABLE 3

Type B Additives $$H_3C-Si(CH_3)_2-O-(Si(CH_3)_2-O)_i-(Si(CH_3)(R)-O)_j-Si(CH_3)_3$$
where $R = (CH_3)_{\overline{3}}O-(C_2H_4O)_y(C_3H_6O)_zR_{24}$

| Additive Code | $R_{24}$ | i | j | y | z | MW | I.D. | Source |
|---|---|---|---|---|---|---|---|---|
| B01 | $CH_3$ | NA[a] | NA | NA | NA | 600 | L-77 | UC[b] |
| B02 | H | 0 | 1 | 10 | 2 | 836 | T-5847 | G[c] |
| B03 | $CH_3$ | 0 | 2 | 10 | 2 | 850 | T-5878 | G |
| B04 | $CH_3$ | NA | NA | NA | NA | 3000 | L-7602 | UC |
| B05 | n-Bu | NA | NA | NA | NA | 3000 | L-7500 | UC |
| B06 | H | 18 | 5 | 12 | 0 | 4724 | T-5842 | G |
| B07 | H | 20 | 5 | 3 | 10 | 5792 | T-5852 | G |
| B08 | H | 20 | 5 | 13 | 3 | 5962 | T-5851 | G |
| B09 | H | 18 | 5 | 16 | 2 | 6184 | T-5857 | G |
| B10 | H | 20 | 5 | 8 | 12 | 7472 | T-5873 | G |
| B11 | H | 43 | 5 | 22 | 23 | 15,444 | T-5863 | G |

[a]Not available.
[b]Union Carbide Corporation, Danbury, Connecticut.
[c]Th. Goldschmidt AG, Essen, Federal Republic of Germany.

TABLE 4

Properties of the Type B Additives of Table 3

| Code | Viscosity[a] | Cloud Point[b] | Refractive Index[c] | Surface Tension |
|---|---|---|---|---|
| B01 | 20 | 10 | NA[d] | 21[e] |
| B02 | 100 | 45 | NA | 23[f] |
| B03 | 25 | Turbid | 1.446 | 20[f] |
| B04 | 100 | 0 | NA | 22[e] |
| B05 | 175 | Insol. | NA | NA |
| B06 | 560 | 80 | 1.450 | 30[f] |
| B07 | 290 | 10 | 1.444 | NA |
| B08 | 430 | 65 | 1.450 | 30[f] |
| B09 | 580 | 84 | 1.449 | 28[f] |
| B10 | 440 | 30 | 1.449 | 28[f] |
| B11 | 2700 | 42 | 1.450 | 30[f] |

[a]In centistokes at 25° C.
[b]In degrees C., of a 1 percent by weight aqueous solution.
[c]At 20° C., ± 0.005.
[d]Not available.
[e]In dynes/cm, ± 1.5, of a 0.1 percent by weight aqueous solution.
[f]In dynes/cm, ± 1.5, of a 0.1 percent by weight aqueous solution.

TABLE 5

Type C Additive $$R_{21}-Si[(-O-Si(CH_3)_2)_g(OC_2H_4)_y(OC_3H_6)_z-OR_{24}]_3$$

| Add. Code | $R_{21}$ | $R_{24}$ | g | y | z | MW | I.D. | Source |
|---|---|---|---|---|---|---|---|---|
| C01 | n-Bu | NA[a] | NA | NA | NA | 8000 | L-720 | UC[b] |

[a]Not available.
[b]Union Carbide Corporation, Danbury, Connecticut.

TABLE 6

Properties of the Type C Additive of Table 3

| Code | Viscosity[a] | Cloud Point[b] | Refractive Index[c] | Surface Tension[d] |
|---|---|---|---|---|
| C01 | 1100 | 42 | NA[e] | 29 |

[a]In centistokes at 25° C.
[b]In degrees C., of a 1 percent by weight aqueous solution.
[c]At 20° C., ± 0.005.
[d]In dynes/cm, ± 1.5, of a 0.1 percent by weight aqueous solution.
[e]Not available.

B. Polymers

The polymers employed are summarized in Table 7 which is based on data supplied by the manufacturers. In the table, the melt flow rate is given in the column labeled "MFR" and was determined in accordance with ASTM Test Method D1238-82, "Standard Test Method for Flow Rates of Thermoplastics by Extrusion Plastomer." The polydispersity, PD, is the ratio of the weight-average molecular weight, $M_w$, to the number-average molecular weight, $M_n$.

TABLE 7

Summary of Polymers Employed

| Polymer Code | MFR | PD | $M_n$ | $M_w$ | Temp. Range[a] |
|---|---|---|---|---|---|
| PPA[b] | 35 | 2.7 | 52,000 | 140,000 | 293–316 |
| PPB[c] | 400 | 4.0 | 17,000 | 68,000 | 254–304 |
| PPC[d] | 400 | 4.0 | 17,000 | 68,000 | 254–304 |
| PEA[e] | NA | NA | NA | NA | NA |

[a]Degrees C.
[b]Type PC-973 polypropylene, Himont Incorporated, Wilmington, Delaware.
[c]Type PF-441 polypropylene, Himont Incorporated.
[d]Type PF-015 polypropylene, Himont Incorporated; the polymer is type PF-441 to which has been added 500 ppm of Lubrizol 101 (Lubrizol, Inc., Wickliffe, Ohio).
[e]Type 61800.06 low density polyethylene, Dow Chemical Co., Midland, Michigan.

II. Use of Compositions in Method of Present Invention

The thermoplastic compositions useful in the present invention can be prepared by various methods. In general, such compositions may be prepared in advance of their use in the method of the present invention, or they may be formed during the cleaning process. The latter procedure is described in the examples which follow.

EXAMPLES 1-80

To a weighed amount of polymer, typically from about 13 to about 45 kg, in a plastic-lined fiber drum was added the desired amount of additive. The components then were mixed mechanically in a paddle mixer (Banbury, Ann Arbor Mich.). The hopper of a twin-screw compounding unit (Egan Machinery Company, Sommerville, N.J.) was charged with the resulting mixture. The mixture was gravity-fed to the compounding screws. Compounding was accomplished at a temperature of from about 180° to about 250°, depending on the polymer employed. The resulting composition was extruded through a die having six orifices with diameters of about 3 mm. The extruded filaments was passed through a ten-foot water bath and then a forced-air blower. The dried filaments were pelletized in a rotary pelletizer (Cumberland Company, New York, N.Y.) and stored in 23-kg lots in plastic-lined boxes. The compositions employed are summarized in Table 8.

TABLE 8

Summary of Compositions Used in the Present Invention

| Example | Composition Code | Polymer Code | Additive(s) Code(s) | Wt. % |
|---|---|---|---|---|
| 1 | PP01-1 | PPA | A21 | 1 |
| 2 | PP02-1 | PPA | A21 | 3 |
| 3 | PP03-1 | PPA | A21 | 5 |
| 4 | PP04-1 | PPA | A21 | 12 |
| 5 | PE01-1 | PEA | A21 | 1 |
| 6 | PE02-1 | PEA | A21 | 3 |
| 7 | PE03-1 | PEA | A21 | 5 |
| 8 | PP05-1 | PPA | B01 | 3 |
| 9 | PP06-1 | PPA | B01 | 5 |
| 10 | PP07-1 | PPB | B01 | 3 |
| 11 | PP08-1 | PPB | B01 | 5 |
| 12 | PP09-1 | PPC | B01 | 3 |
| 13 | PP10-1 | PPC | B01 | 5 |
| 14 | PE04-1 | PEA | B01 | 3 |
| 15 | PE05-1 | PEA | B01 | 5 |
| 16 | PP11-1 | PPA | B02 | 3 |
| 17 | PP12-1 | PPA | B02 | 5 |
| 18 | PP13-1 | PPC | B02 | 3 |
| 19 | PP14-1 | PPC | B02 | 5 |
| 20 | PP15-1 | PPA | B03 | 3 |
| 21 | PP16-1 | PPA | B03 | 5 |
| 22 | PP17-1 | PPC | B03 | 3 |
| 23 | PP18-1 | PPC | B03 | 5 |
| 24 | PP19-1 | PPA | B04 | 3 |
| 25 | PP20-1 | PPA | B04 | 5 |
| 26 | PE06-1 | PEA | B04 | 3 |
| 27 | PE07-1 | PEA | B04 | 5 |
| 28 | PP21-1 | PPA | B05 | 3 |
| 29 | PP22-1 | PPA | B05 | 5 |
| 30 | PE08-1 | PEA | B05 | 3 |
| 31 | PE09-1 | PEA | B05 | 5 |
| 32 | PP23-1 | PPA | B06 | 3 |
| 33 | PP24-1 | PPA | B06 | 5 |
| 34 | PP25-1 | PPC | B06 | 3 |
| 35 | PP26-1 | PPC | B06 | 5 |
| 36 | PP27-1 | PPA | B07 | 3 |
| 37 | PP28-1 | PPA | B07 | 5 |
| 38 | PP29-1 | PPC | B07 | 3 |
| 39 | PP30-1 | PPC | B07 | 5 |
| 40 | PP31-1 | PPA | B08 | 3 |
| 41 | PP32-1 | PPA | B08 | 5 |
| 42 | PP33-1 | PPC | B08 | 3 |
| 43 | PP34-1 | PPC | B08 | 5 |
| 44 | PP35-1 | PPA | B09 | 2 |
| 45 | PP36-1 | PPA | B09 | 3 |
| 46 | PP37-1 | PPA | B09 | 5 |
| 47 | PP38-1 | PPC | B09 | 3 |
| 48 | PP39-1 | PPC | B09 | 5 |
| 49 | PP40-1 | PPA | B10 | 3 |
| 50 | PP41-1 | PPA | B10 | 5 |
| 51 | PP42-1 | PPC | B10 | 3 |
| 52 | PP43-1 | PPC | B10 | 5 |
| 53 | PP44-1 | PPA | B11 | 3 |
| 54 | PP45-1 | PPA | B11 | 5 |
| 55 | PP46-1 | PPC | B11 | 3 |
| 56 | PP47-1 | PPC | B11 | 5 |
| 57 | PP48-1 | PPA | C01 | 1 |
| 58 | PP49-1 | PPA | C01 | 3 |
| 59 | PP50-1 | PPA | C01 | 5 |
| 60 | PE10-1 | PEA | C01 | 1 |
| 61 | PE11-1 | PEA | C01 | 3 |
| 62 | PE12-1 | PEA | C01 | 5 |
| 63 | PP51-1 | PPA | D03 | 3 |
| 64 | PP52-1 | PPA | D04 | 3 |
| 65 | PP53-2 | PPA | B02 | 1 |
|   |   |   | B11 | 1 |
| 66 | PP54-2 | PPA | B02 | 1.5 |

TABLE 8-continued

Summary of Compositions Used in the Present Invention

| Example | Composition Code | Polymer Code | Additive(s) Code(s) | Wt. % |
|---|---|---|---|---|
|   |   |   | B11 | 1.5 |
| 67 | PP55-2 | PPA | B06 | 1 |
|   |   |   | B10 | 1 |
| 68 | PP56-2 | PPA | B06 | 1.5 |
|   |   |   | B10 | 1.5 |
| 69 | PP57-2 | PPA | B10 | 1 |
|   |   |   | B11 | 1 |
| 70 | PP58-2 | PPA | B10 | 1.5 |
|   |   |   | B11 | 1.5 |
| 71 | PP59-3 | PPA | B06 | 1 |
|   |   |   | B09 | 1 |
|   |   |   | B10 | 1 |
| 72 | PP60-3 | PPA | B06 | 1 |
|   |   |   | B09 | 1 |
|   |   |   | B11 | 1 |
| 73 | PP61-3 | PPA | B09 | 0.67 |
|   |   |   | B10 | 0.67 |
|   |   |   | B11 | 0.67 |
| 74 | PP62-3 | PPA | B04 | 0.33 |
|   |   |   | B05 | 0.33 |
|   |   |   | C01 | 0.33 |
| 75 | PP63-3 | PPA | B04 | 0.67 |
|   |   |   | B05 | 0.67 |
|   |   |   | C01 | 0.67 |
| 76 | PP64-3 | PPA | B04 | 1 |
|   |   |   | B05 | 1 |
|   |   |   | C01 | 1 |
| 77 | PP65-3 | PPA | B04 | 1.67 |
|   |   |   | B05 | 1.67 |
|   |   |   | C01 | 1.67 |
| 78 | PE66-3 | PEA | B04 | 0.33 |
|   |   |   | B05 | 0.33 |
|   |   |   | C01 | 0.33 |
| 79 | PE13-3 | PEA | 804 | 1 |
|   |   |   | B05 | 1 |
|   |   |   | C01 | 1 |
| 80 | PE14-3 | PEA | B04 | 1.67 |
|   |   |   | B05 | 1.67 |
|   |   |   | C01 | 1.67 |

The compounding unit most often had been used to prepare colored or pigmented polymers. The unit was cleaned on a daily basis by running through the unit a commercially available cleaner. Such cleaner typically consisted of from about 15 to about 80 percent by weight of a thermoplastic resin, with the remainder of the cleaner consisting of calcium carbonate.

When virgin polymer was run through the cleaned unit, the extruded material was colorless. However, when a composition of Table 8 was prepared or compounded in the unit, the first material to be extruded was colored by residual pigment or pigmented polymer.

This cleaning effect of the thermoplastic compositions described herein appeared to be independent of the additive type. A systematic study to determine the cleaning effectiveness of each composition was not carried out, however, because of the unavailability of standardized "dirty" melt-processing equipment.

Having thus described the invention, numerous changes and modifications thereof will be readily apparent to those having ordinary skill in the art without departing from the spirit or scope of the invention.

What is claimed is:

1. A method of cleaning melt-processing equipment which comprises processing in such equipment a thermoplastic composition which comprises at least one thermoplastic polyolefin and at least one siloxane-containing additive having at least two moieties, A and B, in which:

(A) said additive is compatible with said polyolefin at melt extrusion temperatures but is incompatible at temperatures below melt extrusion temperatures, but each of moiety A and moiety B, if present as separate compounds, would be incompatible with said polyolefin at melt extrusion temperatures and at temperatures below melt extrusion temperatures;

(B) moiety A contains at least one tetrasubstituted disiloxanylene group;

(C) moiety B has at least one functional group which is a poly(oxyalkylene) moiety;

(D) the molecular weight of said additive is in the range of from about 400 to about 16,000; and (E) said additive is present in said thermoplastic composition at a level of from about 3 to about 12 percent by weight, based on the weight of said thermoplastic polyolefin;

in which (1) said at least one thermoplastic polyolefin is not the same polymer as last employed in the melt-processing equipment to be cleaned, and (2) the amount of thermoplastic composition and the processing time are sufficient to clean said processing equipment.

2. The method of claim 1, in which said polyolefin is polyethylene or polypropylene.

3. The method of claim 1, in which the molecular weight of said additive is in the range of from about 400 to about 10,000.

4. The method of claim 1, in which the molecular weight of said additive is in the range of from about 400 to about 3,000.

5. The method of claim 1, in which the molecular weight of said additive is in the range of from about 400 to about 1,000.

6. The method of claim 1, in which said additive is present in said thermoplastic composition at a level of from about 3 to about 5 percent by weight, based on the weight of said thermoplastic polymer.

7. The method of claim 1, in which the alkylene portion of said poly(oxyalkylene) moiety contains from 2 to about 6 carbon atoms.

8. The method of claim 7, in which the oxyalkylene repeating units are oxyethylene or oxypropylene units or a mixture thereof.

9. The method of claim 7, in which said poly(oxyalkylene) moiety is a poly(oxyethylene) moiety.

10. The method of claim 7, in which the oxyalkylene repeating units are a mixture of oxyethylene and oxypropylene units.

11. The method of claim 10, in which the ratio of oxyethylene repeating units to oxypropylene repeating units is from about 10:1 to about 1:10.

12. The method of claim 10, in which the ratio of oxyethylene repeating units to oxypropylene repeating units is from about 5:1 to about 2:1.

13. The method of claim 1, in which the siloxane additive is represented by the general formula,

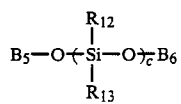

in which each of $R_{12}$ and $R_{13}$ independently is a monovalent group selected from the group consisting of hydrogen, alkyl, cycloalkyl, aryl, and heterocyclic groups, each of which, except for hydrogen, may be substituted or unsubstituted; each of $B_5$ and $B_6$ independently is a poly(oxyalkylene) moiety; and c represents an integer from 2 to about 160.

14. The method of claim 1, in which the siloxane additive is represented by the general formula,

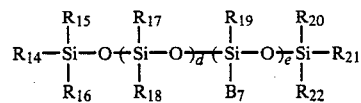

in which each of $R_{14}$-$R_{22}$, inclusive, independently is a monovalent group selected from the group consisting of hydrogen, alkyl, cycloalkyl, aryl, and heterocyclic groups, each of which, except for hydrogen, may be substituted or unsubstituted; $B_7$ is a poly(oxyalkylene) moiety; and each of d and e independently represents an integer from 1 to about 160.

15. The method of claim 1, in which the siloxane additive is represented by the general formula,

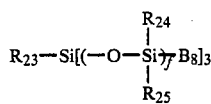

in which each of $R_{23}$-$R_{25}$, inclusive, independently is a monovalent group selected from the group consisting of hydrogen, alkyl, cycloalkyl, aryl, and heterocyclic groups, each of which, except for hydrogen, may be substituted or unsubstituted; $B_8$ is a poly(oxyalkylene) moiety; and f represents an integer from 1 to about 160.

* * * * *

UNITED STATES PATENT AND TRADEMARK OFFICE
CERTIFICATE OF CORRECTION

PATENT NO. : 4,976,788

DATED : December 11, 1990

INVENTOR(S) : Ronald S. Nohr, J. Gavin MacDonald

It is certified that error appears in the above-identified patent and that said Letters Patent is hereby corrected as shown below:

Column 19, line 4, "was" should read --were--;

Column 20, line 33, "804" should read --B04--.

Signed and Sealed this

Eighth Day of June, 1993

Attest:

MICHAEL K. KIRK

Attesting Officer     Acting Commissioner of Patents and Trademarks